March 14, 1950 A. WERNER ET AL 2,500,224
COLLOCATING DEVICE FOR TOOLS
Filed Nov. 23, 1945 2 Sheets-Sheet 1

INVENTORS.
Anton Werner
Joseph Kiss Jr.
BY
ATTORNEY

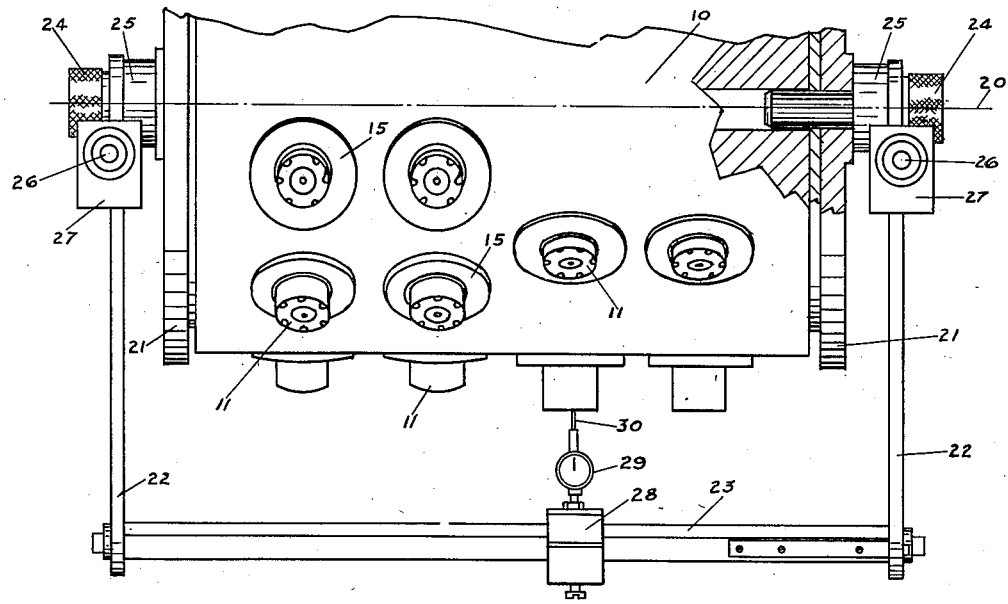
Fig. 3
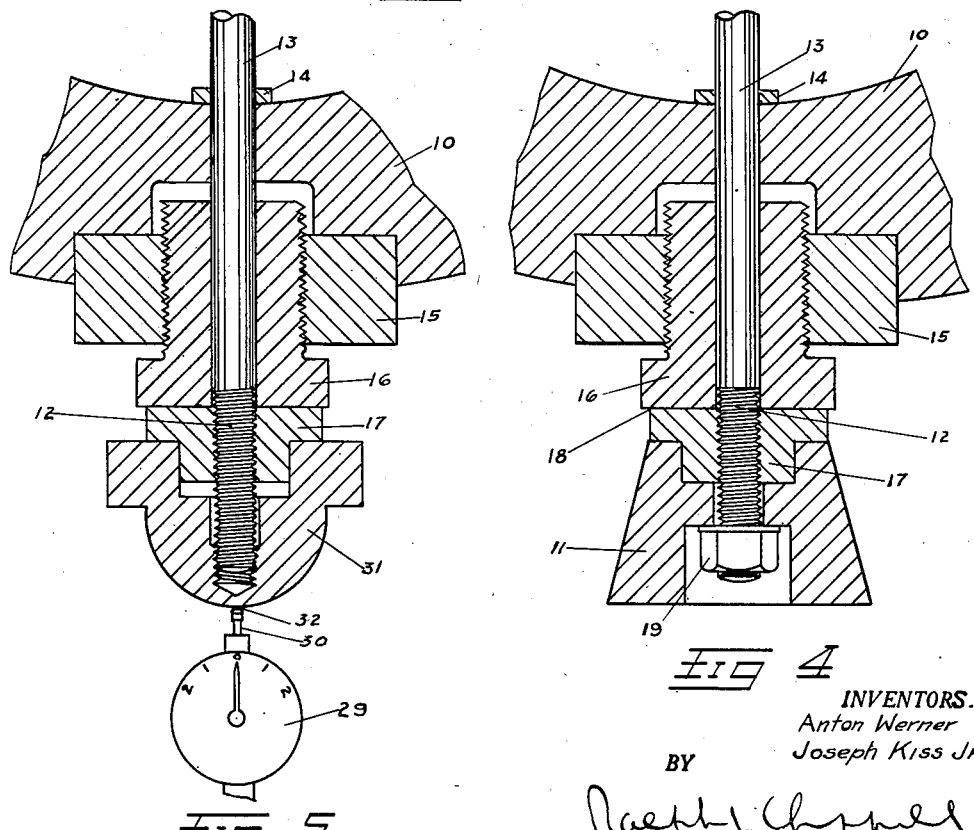
Fig. 4
Fig. 5
INVENTORS.
Anton Werner
Joseph Kiss Jr.
BY
ATTORNEY Patented Mar. 14, 1950

2,500,224

UNITED STATES PATENT OFFICE 2,500,224

COLLOCATING DEVICE FOR TOOLS

Anton Werner and Joseph Kiss, Jr., New York, N. Y.

Application November 23, 1945, Serial No. 630,512

3 Claims. (Cl. 33—185)

(Granted under the act of March 3, 1883, as amended April 30, 1928; 370 O. G. 757)

The present invention relates to a collocating device to be used in checking the correct spacing or positioning of adjustable cutting tools disposed about the periphery of a cylindrical body.

In the cutting of internal channels in a tubular member, the cutting tools are fixedly disposed about a cylindrical surface, and urged toward said tubular member so that the cutting tools cut out channels or grooves, the latter being determined by the shape of the cutters. Means are necessary for determining the accuracy with which these cutters are disposed or positioned about the cylindrical surface that supports them so as to insure accurate cutting of the aforementioned channels or grooves.

An object of the present invention is to provide simple and easily operable alignment means for a multiple-cutter machine.

A further object is to provide aligning means that decreases the time required to check the proper alignment of a multiple-cutter machine.

Figure 1:
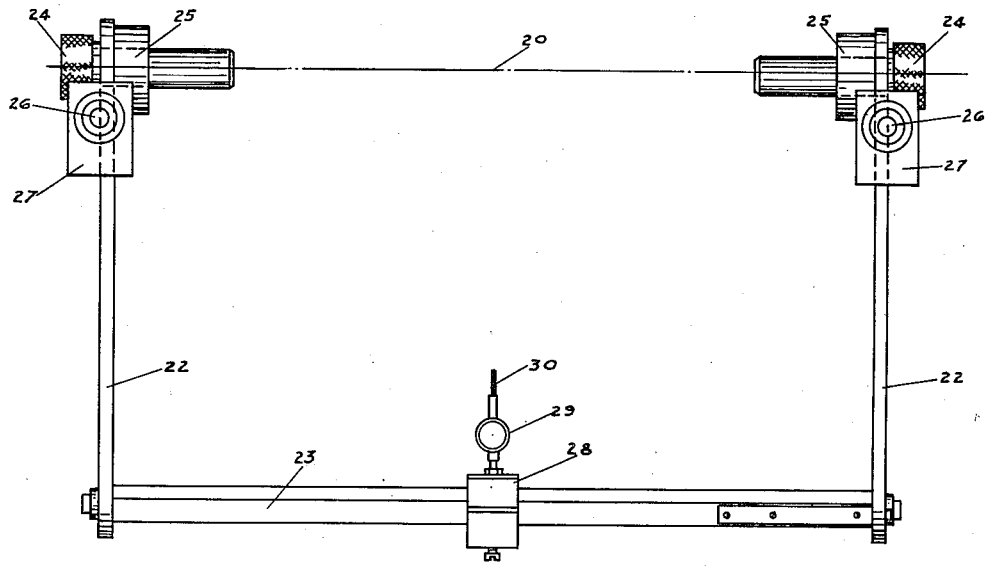
Figure 2:
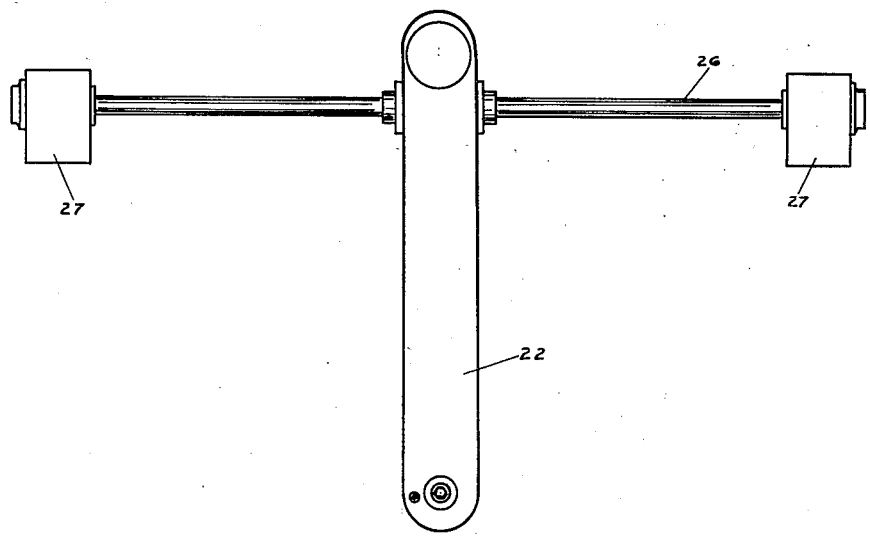

Further objects and advantages of this invention, as well as its construction, arrangement and operation are apparent from the following description and claims in connection with the accompanying drawings, in which Fig. 1 is a front elevation view of an embodiment of the present invention rising from the body 10. The raising or lowering of bushing 16 serves to increase or decrease the distance that cutter 11, to be secured to spindle 12, is spaced from the axis of the body 10 that supports the cutters 11. A lock nut 17 engages the rod 13 until its head 18 is flush against the underside of the bushing 16. The cutter 11 is held fast to the rod 13 by the holding nut 19 that urges cutter 11 against the shoulder of the lock nut 17.

The centerline 20 of the cylindrical member 10 is the axis of the cutters 11. The radial distance between the centerline 20 and the circumference of the face plate 21 is fixed and known. This radial distance is equal to the radial distance that the centerline 20 or axis of cylindrical member 10 is from the base of the guide plate 15.

The present invention comprises a pair of accurately machined vertically disposed arms 22 that are kept in parallel relation with each other by the horizontal bar 23 reinforcedly secured near the lower extremities of said arms 22. The upper extremities of the arms 22 are secured to the cylindrical body 10 by means of center plugs 24 that ride in countersunk portions of the cylindrical member 10. The upper extremities of the arms 22 ride on suitable bearings 25 as shown in Fig. 3.

cator 29, how much adjustment in length of spindle 12 is necessary before milling operation begins.

In practice, a standard thimble block 31, as shown in Fig. 5, is secured to a spindle 12 and the stem tip 32 of the dial indicator 29 is urged against the base of block 31 to determine the final setting of the bushing 16 prior to assembling the cutter 11 onto its respective spindle 12. Each spindle 12 is adjusted to its predetermined length in this manner, the spindle length being varied according to the depth specification of the channel to be cut by cutters 11.

The present invention can be made in various sizes to test the alignment of cutters that are disposed about a cylindrical surface. The horizontal bar 23 that is constrained to remain parallel to the centerline 20 or axis of the cylindrical body 10, as it moves in an arc of constant radius about said center line, can accommodate various type dial indicators should the cutter 11 be of such a shape or configuration as to require different gages to test their accurate positioning about the periphery of said cylindrical body 10.

The fixture herein described is readily engageable to or detachable from a multiple-cutter machine and considerably expedites the checking of the desired position of cutters on a multiple-cutter machine.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A collocating device adapted for use with tools on a drum, said device comprising a pair of normally vertical, parallel arms adapted to be detachably mounted on opposite ends of the drum and substantially radially disposed relative to the drum axis, a rod connecting said arms, an indicator extending from said rod toward the drum axis, a transverse arm on at least one of said normally vertical arms between the drum axis and said rod, and a pair of spaced weights on said transverse arm in symmetrical location on opposite sides of said normally vertical arm.

2. A collocating device adapted for use with tools on a drum, said device comprising a pair of normally vertical, parallel arms adapted to be detachably mounted on opposite ends of the drum and substantially radially disposed relative to the drum axis, a rod connecting said arms, an indicator extending from said rod toward the drum axis, a transverse arm on at least one of said normally vertical arms between the drum axis and said rod, said transverse arm being relatively close to the drum axis, and a pair of spaced weights on said transverse arm in symmetrical location on opposite sides of said normally vertical arm, said weights being relatively remote from said normally vertical arm.

3. A collocating device adapted for use with tools on a drum, said device comprising a pair of normally vertical, parallel arms adapted to be detachably mounted on opposite ends of the drum and substantially radially disposed relative to the drum axis, a rod connecting said arms, an indicator extending from said rod toward the drum axis, a transverse arm on each of said normally vertical arms, each of said transverse arms being relatively close to the drum axis, and a pair of spaced weights on each transverse arm in symmetrical location on opposite sides of the normally vertical arm, said weights being relatively remote from the normally vertical arm.

ANTON WERNER.
JOSEPH KISS, Jr.

REFERENCES CITED

The following references are of record in the file of this patent:

UNITED STATES PATENTS

| Number | Name | Date |
|---|---|---|
| 89,394 | Evans | Apr. 27, 1869 |
| 536,103 | Snyder et al. | Mar. 19, 1895 |
| 846,723 | Blood | Mar. 12, 1907 |
| 1,194,460 | Yocum | Aug. 15, 1916 |
| 1,641,114 | Carlson | Aug. 30, 1927 |
| 2,397,795 | Lersch | Apr. 2, 1946 |